US011831028B2

(12) United States Patent
Zhang et al.

(10) Patent No.: US 11,831,028 B2
(45) Date of Patent: Nov. 28, 2023

(54) SECONDARY BATTERY

(71) Applicant: Contemporary Amperex Technology Co., Limited, Ningde (CN)

(72) Inventors: Jie Zhang, Ningde (CN); Zhijun Guo, Ningde (CN); Peng Wang, Ningde (CN); Guowei Li, Ningde (CN); Taosheng Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 54 days.

(21) Appl. No.: 16/965,290

(22) PCT Filed: Apr. 17, 2018

(86) PCT No.: PCT/CN2018/083382
§ 371 (c)(1),
(2) Date: Jul. 27, 2020

(87) PCT Pub. No.: WO2019/148663
PCT Pub. Date: Aug. 8, 2019

(65) Prior Publication Data
US 2021/0074963 A1    Mar. 11, 2021

(30) Foreign Application Priority Data

Feb. 1, 2018    (CN) .......................... 201810102115.X

(51) Int. Cl.
*H01M 50/147*    (2021.01)
*H01M 50/559*    (2021.01)
(Continued)

(52) U.S. Cl.
CPC ......... *H01M 50/147* (2021.01); *H01M 50/16* (2021.01); *H01M 50/179* (2021.01);
(Continued)

(58) Field of Classification Search
CPC ............. H01M 50/531; H01M 50/543; H01M 50/147; H01M 50/155; H01M 2220/20
See application file for complete search history.

(56) References Cited

U.S. PATENT DOCUMENTS

2016/0006006 A1*   1/2016  Motokawa .......... H01M 50/308
                                                      429/54
2016/0336545 A1*  11/2016  Wakimoto .......... H01M 50/578
(Continued)

FOREIGN PATENT DOCUMENTS

CN          2859815 Y      1/2007
CN        201741740 U      2/2011
(Continued)

OTHER PUBLICATIONS

Machine translation of JP 2017199555 A (Year: 2017).*
(Continued)

*Primary Examiner* — Matthew T Martin
*Assistant Examiner* — Unique Jenevieve Luna
(74) *Attorney, Agent, or Firm* — East IP P.C.

(57) ABSTRACT

A secondary battery including: a case including an opening; a top cover assembly including a top cover plate covering the opening and an electrode terminal, the top cover plate including an electrode lead-out hole corresponding to the electrode terminal; an electrode assembly received in the case and including a main body and a tab, the tab being bent relative to a thickness direction of the top cover plate to form a bent portion; and a current collecting wiring board disposed between the top cover plate and the main body and including a first connection portion, a second connection portion, and a transition portion, the first connection portion and the second connection portion extending along a width direction of the top cover plate and being provided opposite to each other, the first connection portion being connected
(Continued)

with the electrode terminal, and the second connection portion being connected with the bent portion.

15 Claims, 8 Drawing Sheets

(51) Int. Cl.
    *H01M 50/548*     (2021.01)
    *H01M 50/16*     (2021.01)
    *H01M 50/533*     (2021.01)
    *H01M 50/179*     (2021.01)

(52) U.S. Cl.
    CPC ....... *H01M 50/533* (2021.01); *H01M 50/548* (2021.01); *H01M 50/559* (2021.01); *H01M 2220/20* (2013.01)

(56) References Cited

U.S. PATENT DOCUMENTS

| | | | |
|---|---|---|---|
| 2016/0351866 A1* | 12/2016 | Tsutsumi | H01M 10/0525 |
| 2017/0149044 A1* | 5/2017 | Koo | H01M 50/543 |
| 2017/0288275 A1* | 10/2017 | Yokoshima | H01M 10/0587 |
| 2018/0123110 A1* | 5/2018 | Hirose | H01M 10/052 |
| 2018/0183018 A1* | 6/2018 | Maeda | H01M 50/543 |

FOREIGN PATENT DOCUMENTS

| | | | | |
|---|---|---|---|---|
| CN | 202651222 U | 1/2013 | | |
| CN | 103378321 A | 10/2013 | | |
| CN | 105702906 A | 6/2016 | | |
| CN | 106207276 A | 12/2016 | | |
| CN | 206250261 U | 6/2017 | | |
| CN | 206401375 U | 8/2017 | | |
| CN | 107123774 A | 9/2017 | | |
| CN | 206742365 U | 12/2017 | | |
| CN | 107615520 A | 1/2018 | | |
| JP | 2002298823 A | 10/2002 | | |
| JP | 2005317367 A | 11/2015 | | |
| JP | 2017199555 A | * | 11/2017 | |
| KR | 20080072132 A | * | 8/2008 | ........ H01M 2220/20 |
| WO | 2016152372 A1 | 9/2016 | | |
| WO | WO-2017047789 A1 | * | 3/2017 | ............ H01G 11/74 |

OTHER PUBLICATIONS

The extended European search report for EP Application No. 18903711.2, dated Feb. 17, 2021, 6 pages.
The Third Office Action for China Application No. 201810102115.X, dated Dec. 1, 2020, 7 pages.
The Rejection Decision for China Application No. 201810102115.X, dated May 6, 2021, 7 pages.
The International Search Report for PCT/CN2018/083382, dated Aug. 27, 2018, 11 pages.
First Office Action and Search Report for Chinese Application No. 201810102115.X, dated Jul. 22, 2019, 8 pages.
Second Office Action and Search Report for Chinese Application No. 201810102115.X, dated May 13, 2020, 7 pages.

* cited by examiner

SECONDARY BATTERY

CROSS-REFERENCE TO RELATED APPLICATION

This present application is a National Stage of International Application No. PCT/CN2018/083382 filed on Apr. 17, 2018, which claims the priority of the Chinese patent application No. 201810102115.X, entitled "secondary battery" and filed on Feb. 1, 2018, both of which are incorporated herein by reference in their entireties.

TECHNICAL FIELD

The present disclosure relates to the technical field of energy storage device, in particular to a secondary battery.

BACKGROUND

New energy vehicles are widely popularized in China and even in the world, but in order to completely replace fuel vehicles, they still need to be improved a lot. For example, the problems such as the low mileage of automobiles, the high cost of battery packs, and the reliability of battery packs need to be further resolved. Based on the above problems, higher requirements are proposed on the core member (the power battery) of electric vehicles, for example, higher energy density and lower cost need to be reached for the power battery.

Nowadays, the power battery generally adopts a square hard-housing structure, the housing of the power battery includes a case and a top cover assembly, the housing of the power battery provides an enclosed space for receiving an electrode assembly and an electrolyte, and power energy of the electrode assembly is led out from internal of the enclosed space by an electrode column of the top cover assembly to external of the enclosed space. In the existing top cover assembly, a top cover plate is a metal plate and is provided with a through hole, the electrode column includes a bottom portion and an elongation portion, and an area of a cross section of the bottom portion is larger than an aperture of the through hole. When being assembled, the bottom portion is disposed below the top cover plate (that is, inside the case), and the elongation portion is fixed by a snap spring or by riveting after the elongation portion passes through the through hole, and the electrode column is fixed to the top cover plate in such way. Since the bottom portion is disposed inside the casing, the space utilization rate inside the case may be reduced, thereby the energy density of the power battery may be reduced. Furthermore, many connection procedures and complicated operation between the electrode column and the top cover plate and a tab of the electrode assembly, may result in problems of low manufacture efficiency and high cost, and the complicated connection procedures may also affect the manufacture quality of the secondary battery.

In addition, in order to connect the electrode column to a wiring board inside the case of the battery, the bottom portion disposed inside the case may be provided to have a certain thickness, which is usually 1.5 to 4 mm, therefore the space utilization rate inside the battery case may be reduced, and manufacture cost may be increased.

Therefore, there is an urgent need for a novel secondary battery.

SUMMARY

According to an embodiment of the present disclosure, a secondary battery is provided, which can improve the connection stability between the electrode terminal of the secondary battery and the electrode assembly, and promote the energy density of the secondary battery.

According to an aspect of the embodiment of the present disclosure, there is provided a secondary battery including: a case including an opening; a top cover assembly including a top cover plate and an electrode terminal, the top cover plate covering the opening and including an electrode lead-out hole corresponding to the electrode terminal; an electrode assembly received in the case, the electrode assembly including a main body and a tab, the tab extending out from a side of the main body close to the top cover plate and being bent relative to a thickness direction of the top cover plate to form a bent portion; and a current collecting wiring board disposed between the top cover plate and the main body, the current collecting wiring board including a first connection portion, a second connection portion, and a transition portion connected between the first connection portion and the second connection portion, the first connection portion and the second connection portion extending along a width direction of the top cover plate and being provided opposite to each other, the first connection portion being connected with the electrode terminal, and the second connection portion being connected with the bent portion.

According to an aspect of the embodiment of the present disclosure, the top cover plate is made of plastic material, and the first connection portion is fitted against the top cover plate.

According to an aspect of the embodiment of the present disclosure, the electrode terminal includes a base portion and an extension portion connected to the base portion, an area of a cross section of the base portion is larger than an area of a cross section of the electrode lead-out hole, the base portion is disposed on a side of the top cover plate away from the electrode assembly, and the extension portion extends into the electrode lead-out hole and is connected with the first connection portion.

According to an aspect of the embodiment of the present disclosure, a cross section of the extension portion is one of oval and square in shape, and the shape of the cross section of the electrode lead-out hole matches a shape of the cross section of the extension portion.

According to an aspect of an embodiment of the present disclosure, the first connection portion includes an attachment hole, the electrode terminal further includes a boss whose shape matches that of the attachment hole, the boss extends from the extension portion in a direction toward the electrode assembly and extends into the attachment hole, and the extension portion is welded to the first connection portion.

According to an aspect of the embodiment of the present disclosure, a cross section of the attachment hole is one of oval and square in shape.

According to an aspect of the embodiment of the present disclosure, the top cover plate further includes a first groove, the first groove surrounds a periphery of the electrode lead-out hole and is disposed on a side of the top cover plate facing away from the electrode assembly, and at least part of the base portion is received in the first groove.

According to an aspect of the embodiment of the present disclosure, the secondary battery further includes a sealing member, the sealing member includes a body portion which is annular and an annular flange extending outwardly from an circumferential edge of an inner hole of the body portion, the body portion is disposed between the base portion and the top cover plate, the annular flange extends into the electrode lead-out hole, and are in contact with the extension portion and the top cover plate respectively.

According to an aspect of the embodiment of the present disclosure, the top cover plate further includes a second groove which is annular, the second groove surrounds a periphery of the electrode lead-out hole and is disposed on a side of the top cover plate facing away from the electrode assembly, and the body portion of the sealing member is at least partially received in the second groove.

According to an aspect of the embodiment of the present disclosure, the tab is bent around an edge of the second connection portion to form the bent portion, and the bent portion is disposed between the first connection portion and the second connection portion.

According to an aspect of an embodiment of the present disclosure, the first connection portion, the transition portion, and the second connection portion have an integral structure.

According to an aspect of the embodiment of the present disclosure, a first notch is provided on an inner surface at a junction of the first connection portion and the transition portion; and/or, a second notch is provided on an inner surface at a junction between the second connection portion and the transition portion.

According to an aspect of the embodiment of the present disclosure, the top cover plate further includes a third groove which is annular, the third groove surrounds a periphery of the electrode lead-out hole and is disposed on a side of the top cover plate facing the electrode assembly, and the first connection portion is at least partially received in the third groove.

According to an aspect of the embodiment of the present disclosure, the area of the cross section of the boss is smaller than the area of the cross section of the extension portion.

According to an aspect of the embodiment of the present disclosure, the second connection portion of the current collecting wiring board includes a first plate body and a second plate body, the first plate body and the second plate body are both connected to the transition portion, and the bent portion is disposed between the first plate body and the second plate body.

DESCRIPTION OF THE DRAWINGS

The present disclosure can be better understood from the following description of specific embodiments of the present disclosure in conjunction with the accompanying drawings.

Other features, objects, and advantages of the present disclosure will become more apparent by reading the following detailed description of the non-limiting embodiments with reference to the drawings, and the same or similar reference numerals indicate the same or similar features, in which.

DESCRIPTION OF REFERENCE NUMERALS

Figure 1:
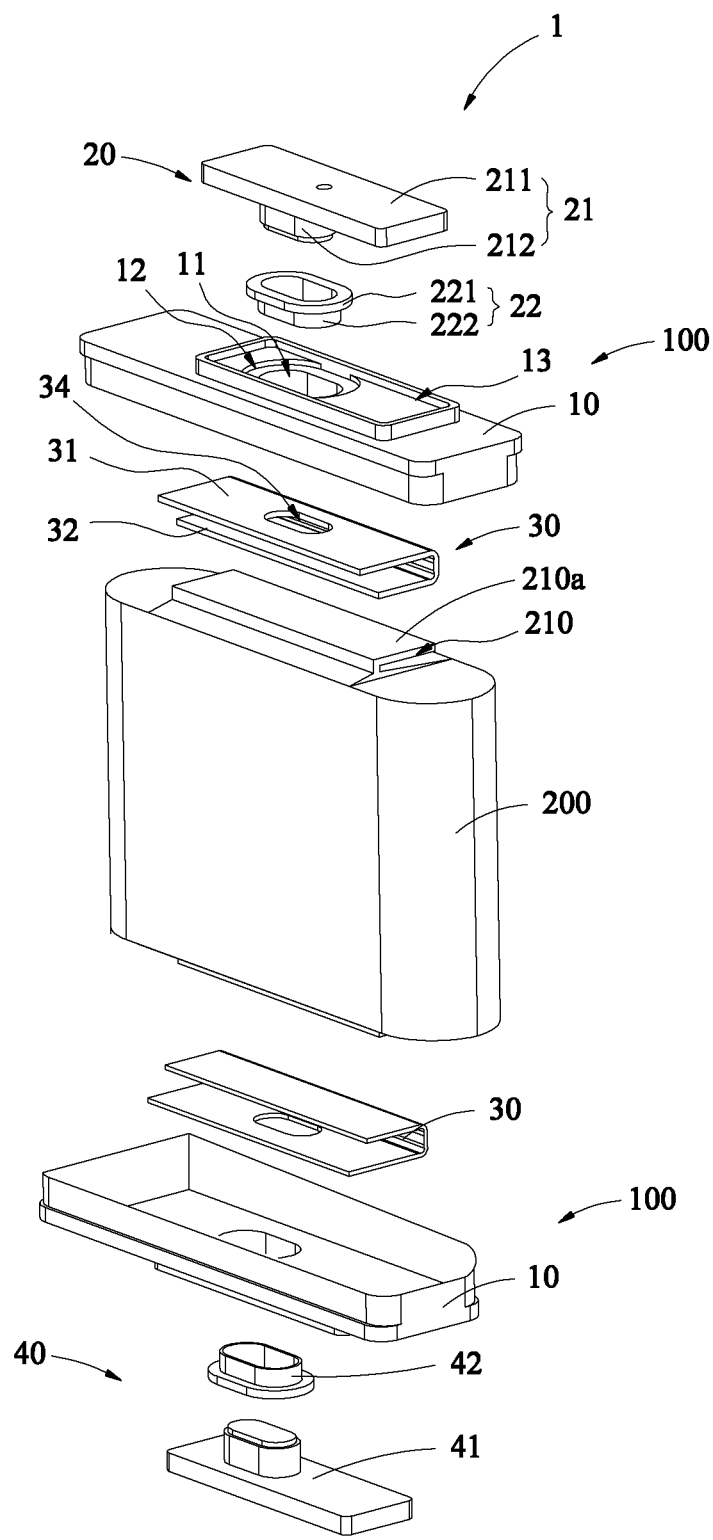
FIG. 1 is a schematic view of an exploded structure of a secondary battery according to an embodiment of the present disclosure.

1—secondary battery; 2—secondary battery;
100—top cover assembly; 200—electrode assembly; 210—tab; 210*a*—bent portion; 220—tab; 300—case;
10—top cover plate; 11—electrode lead-out hole; 12—second groove; 13—first groove;
20—first terminal assembly; 21—electrode terminal; 211—base portion; 212—extension portion; 212*a*—boss; 213—electrode column; 213*a*—elongation portion; 213*b*—bottom portion; 214—connection plate; 214*a*—through hole; 22—sealing member; 221—body portion; 222—annular flange;
30—current collecting wiring board; 31—first connection portion; 32—second connection portion; 321—first plate body; 322—second plate body; 33—transition portion; 34—attachment hole; 35—first notch; 36—second notch;
40—second terminal assembly; 41—electrode terminal; 42—sealing member.

DETAILED DESCRIPTION

Features and exemplary embodiments of various aspects of the present disclosure are described in detail below. In the following detailed description, numerous specific details are set forth, to provide comprehensive understanding of the present disclosure. However, for those skilled in the art, it will be apparent to that the present disclosure may be practiced without some of the specific details. The following description of the embodiments is merely to provide a better understanding of the present disclosure by illustrating examples of the present disclosure. In the drawings and the following description, at least some of the known structures and techniques are not shown, to avoid unnecessarily obscuring the present disclosure. Further, for clarity, the size of some of the structures may be enlarged. The same reference numerals in the drawings indicate the same or similar structures, and thus their detailed description will be omitted. Further, features, structures, or characteristics described hereinafter may be combined in any suitable manner in one or more embodiments.

The orientation terms appearing in the following description refer to the directions shown in the drawings, and are not intended to limit the specific structure of the secondary battery of the present disclosure. In the description of the present disclosure, it should also be noted that, unless otherwise explicitly stated and defined, the term "attach", "connect to" or "connect with" shall be understood broadly, for example, it may be fixed connection, or may be detachable connection or integral connection; it may be direct connection, or may be indirect connection. For those skilled in the art, the specific meaning of the above terms in the present disclosure may be understood based on the specific situation.

Since the tab needs to extend a certain length toward the top cover plate when connected with the wiring board, an extending length of the tab will also occupy a large space inside the case, therefore the energy density of the secondary battery may also be reduced. However, the secondary battery provided by the embodiments of the present disclosure can be cyclically charged and discharged, to facilitate multiple uses of the secondary battery; the secondary battery in the embodiments of the present disclosure has a simple structure, can ensure the connection strength between electrode terminals and electrode assemblies, improve the energy density of the secondary battery, and effectively improve the production efficiency of the secondary battery, and reduce the manufacture cost.

In order to better understand the present disclosure, the secondary battery according to the embodiments of the present disclosure will be described in detail below with reference to FIGS. 1 to 8.

Figure 2:
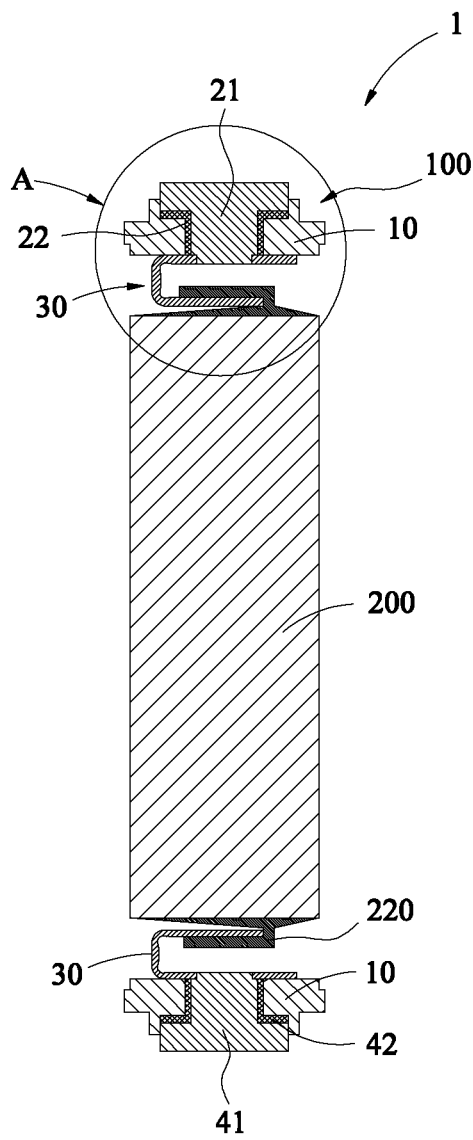
FIG. 2 is a schematic view of a sectional structure taken along a width direction of the secondary battery of FIG. 1.

FIG. 1 is a schematic view of an exploded structure of a secondary battery 1 according to an embodiment of the present disclosure; FIG. 2 is a schematic view of a sectional structure taken along a width direction of the secondary battery 1 in FIG. 1. As shown in FIG. 1, the secondary battery 1 generally includes: a top cover assembly 100, a case (not shown in the figure), and an electrode assembly 200 disposed inside the case.

According to an embodiment of the present disclosure, the case may be made of plastic material, such as polyethylene (Polyethylene, PE) or polypropylene (Polypropylene, PP). The case is formed as a rectangular box in shape, and includes an opening, to communicate a receiving space inside the case through the opening. Apparently, in other alternative embodiments, the case may also be made of metal material.

A main body of the electrode assembly 200 may be formed by stacking or winding a first electrode plate, a second electrode plate, and a separator together; the separator is an insulator sandwiched between the first electrode plate and the second electrode plate. In this embodiment, the first electrode plate is exemplified as a positive electrode plate, and the second electrode plate is exemplified as a negative electrode plate. Alternatively, in other embodiments, the first electrode plate may be the negative electrode plate, while the second electrode plate is the positive electrode plate. In addition, a positive-electrode-plate active material is coated on a coating region of the positive electrode plate, and a negative-electrode-plate active material is coated on a coating region of the negative electrode plate. An uncoated region extending out from the coating region of the main body serves as a tab; the electrode assembly 200 includes two tabs, i.e., a tab 210 (which may be a positive tab or a negative tab) and a tab 220 (which may be correspondingly the negative tab or the positive tab); one of the two tabs extends out from the coating region of the positive electrode plate, and the other extends out from the coating region of the negative electrode plate.

The top cover assembly 100 is used to seal the case, and the electrode assembly 200 can be sealed inside the case by connecting the cap assembly 100 to the opening of the case. Specifically, a positive electrode and a negative electrode for the electrode assembly 200 of the secondary battery 1 in the embodiment of the present disclosure are led out to outside of the secondary battery 1 from two opposite directions, respectively. That is, the secondary battery 1 includes two top cover assemblies 100, and the two top cover assemblies 100 are respectively disposed on upper and lower sides of the secondary battery 1. One of the terminal assembly for the positive electrode and the terminal assembly for the negative electrode which lead out electric power of the electrode assembly 200 to the outside of the secondary battery 1 is attached to the top cover assembly 100 disposed on top of the secondary battery 1, and the other of the terminal assembly for the positive electrode and the terminal assembly for the negative electrode is attached to the top cover assembly 100 disposed at bottom of the secondary battery 1.

Since the structures of the two top cover assemblies 100 disposed on two sides of the secondary battery 1 are completely the same, the structure of the top cover assembly 100 will be described below by taking only the top cover assembly 100 disposed on the upper side of the secondary battery 1 as an example. Apparently, in other alternative embodiments, the structures of the top cover assemblies disposed on the upper and lower sides of the secondary battery may also be configured differently according to prior art.

Figure 3:
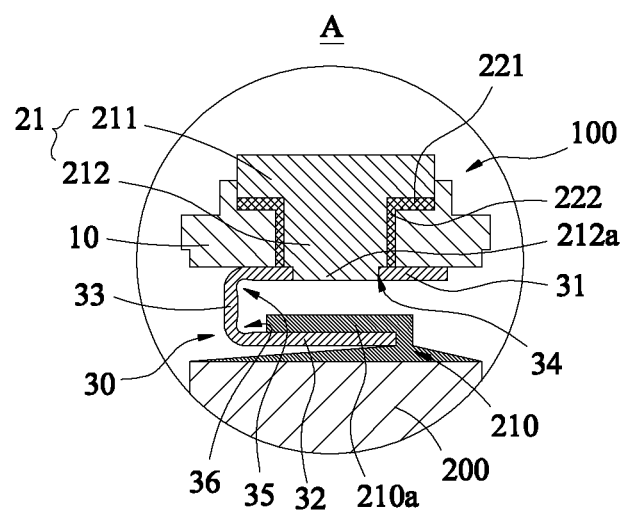
FIG. 3 is an enlarged schematic view of a partial structure of part A of the secondary battery in FIG. 2.

FIG. 3 is an enlarged schematic view of a partial structure of part A of the secondary battery 1 in FIG. 2. As shown in FIGS. 1 to 3, the top cover assembly 100 generally includes: a top cover plate 10, a first terminal assembly 20, and a current collecting wiring board 30. The top cover plate 10 has a thin plate shape, and has a size and shape matching that of the opening of the casing, so as to be able to be connected at the opening of the casing. The top cover plate 10 is made of insulating plastic material, and the top cover plate 10 may be made of high temperature resistant plastic material, for example, may be made of one or more of polyphenylene sulfide (Polyphenylene Sulfide, PPS), perfluoroalkoxy (Perfluoroalkoxy, PEA) resin or polypropylene (Polypropylene, PP).

According to a specific example of the present disclosure, the first terminal assembly 20 includes an electrode terminal 21 and a sealing member 22. In order to attach the first terminal assembly 20, the top cover plate 10 is provided with an electrode lead-out hole 11. According to the embodiment of the present disclosure, the electrode terminal 21 includes two portions, i.e., an external wiring portion for realizing electrical connection with external members and an internal wiring portion for realizing electrical connection with the tab 210 of a battery core inside the case in the secondary battery 1. In a specific example, the electrode terminal 21 is a positive electrode terminal (apparently, the electrode terminal 21 may also be a negative electrode terminal), which may be made of aluminum or aluminum alloy material.

The electrode terminal 21 includes a base portion 211 and an extension portion 212 connected with the base portion 211. Apparently, in some embodiments, the base portion 211 and the extension portion 212 adopt an integral structure. The base portion 211 has a plate-shaped body, the extension portion 212 has a columnar structure, and an area of a cross section of the base portion 211 is larger than an area of a cross section of the extension portion 212. Moreover, the area of the cross section of the base portion 211 is larger than an area of a cross section of the electrode lead-out hole 11, and the area of the cross section of the extension portion 212 adapts the area of the cross section of the electrode lead-out hole 11.

Therefore, the first terminal assembly 20 when being assembled needs to be assembled from top to bottom, the base portion 211 of the electrode terminal 21 is disposed on a side of the top cover plate 10 facing away from the electrode assembly 200, and the extension portion 212 penetrates through the electrode lead-out hole 11, such that the base portion 211 abuts against a surface on the side of the top cover plate 10 facing away from the electrode assembly 200, so as to limit the entire electrode terminal 21. That is, after the electrode terminal 21 is attached to the top cover plate 10, an outer peripheral surface of the base portion 211 protrudes out from an inner wall of the electrode lead-out hole 11. Thus, the base portion 211 of the electrode terminal 21 functions as the external wiring portion, and the connection with a bus-bar is achieved by the base portion 211; and the extension portion 212 functions as the internal wiring portion, and the connection with the tab 210 of the electrode assembly 200 is achieved by the extension portion 212.

According to an embodiment of the present disclosure, the current collecting wiring board 30 is disposed between the electrode terminal 21 and the main body of the electrode assembly 200, as a transitional connection member between the electrode terminal 21 and the tab 210, in some embodiments, the current collecting wiring board 30 is made of the same metal material as the electrode terminal 21 and the tab 210. The current collecting wiring board 30 includes: a first connection portion 31, a second connection portion 32, and a transition portion 33; the transition portion 33 is connected between the first connection portion 31 and the second connection portion 32, such that the current collecting wiring board 30 as a whole is constructed as a substantial C shape. Moreover, in order to ensure the connection stability between the electrode terminal 21 and the tab 210, the first connection portion 31, the second connection portion 32, and the transition portion 33 are made in an integral manner.

According to a specific example of the present disclosure, both the first connection portion 31 and the second connection portion 32 are in the shape of a straight plate, and extend along a width direction of the top cover plate 10. In this embodiment, by way of example, both the first connection portion 31 and the second connection portion 32 are parallel to the top cover plate 10. However, with both the first connection portion 31 and the second connection portion 32 extending along the width direction of the top cover plate 10, it is not meant that the both must be parallel to the top cover plate 10, as long as the first connection portion 31 and the second connection portion 32 extend substantially along the width direction of the top cover plate 10. That is, the first connection portion 31 and the second connection portion 32 may incline slightly relative to the top cover plate 10.

Thus, the first connection portion 31 of the current collecting wiring board 30 may be connected with the electrode terminal 21, and the second connection portion 32 may be connected with the tab 210.

Figure 4:
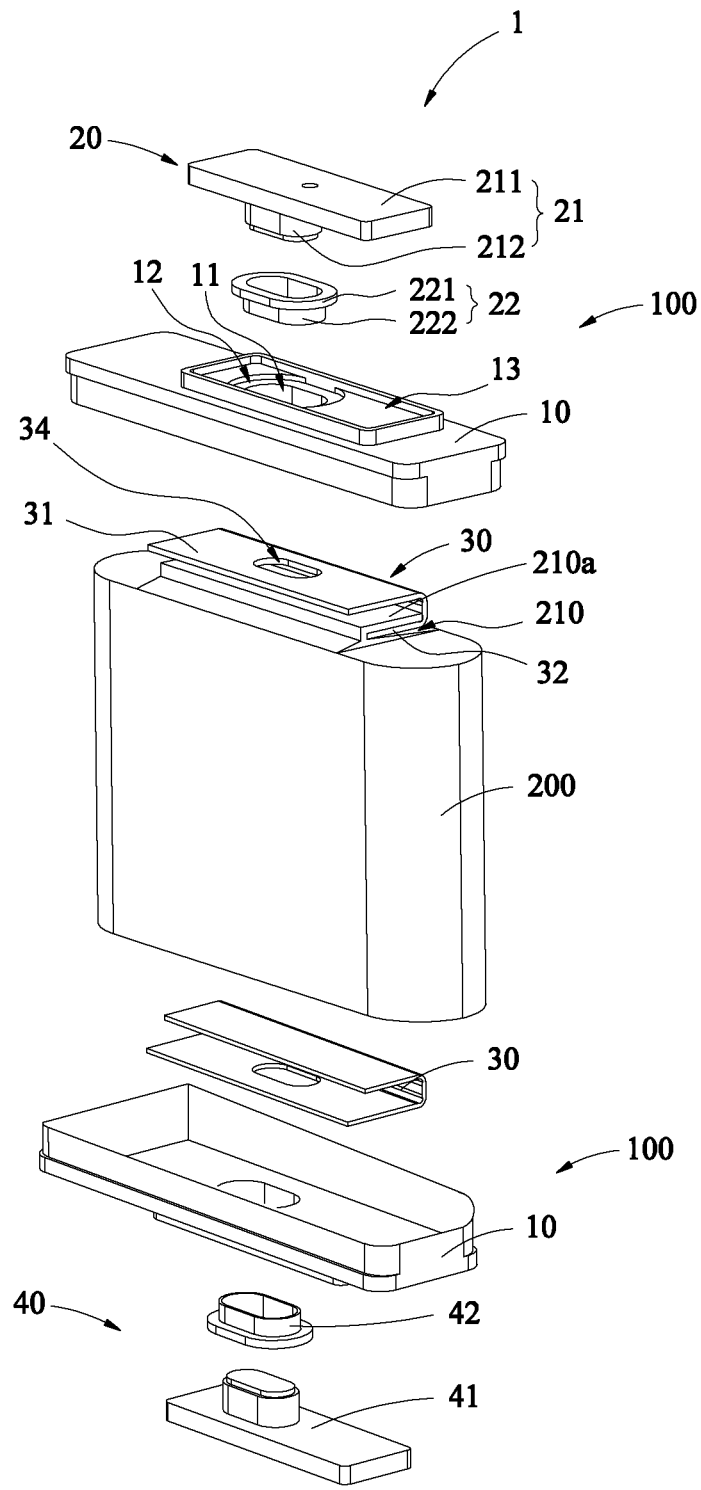
FIG. 4 is a schematic view of one attachment state of the secondary battery in FIGS. 1 and 2.
Figure 5:
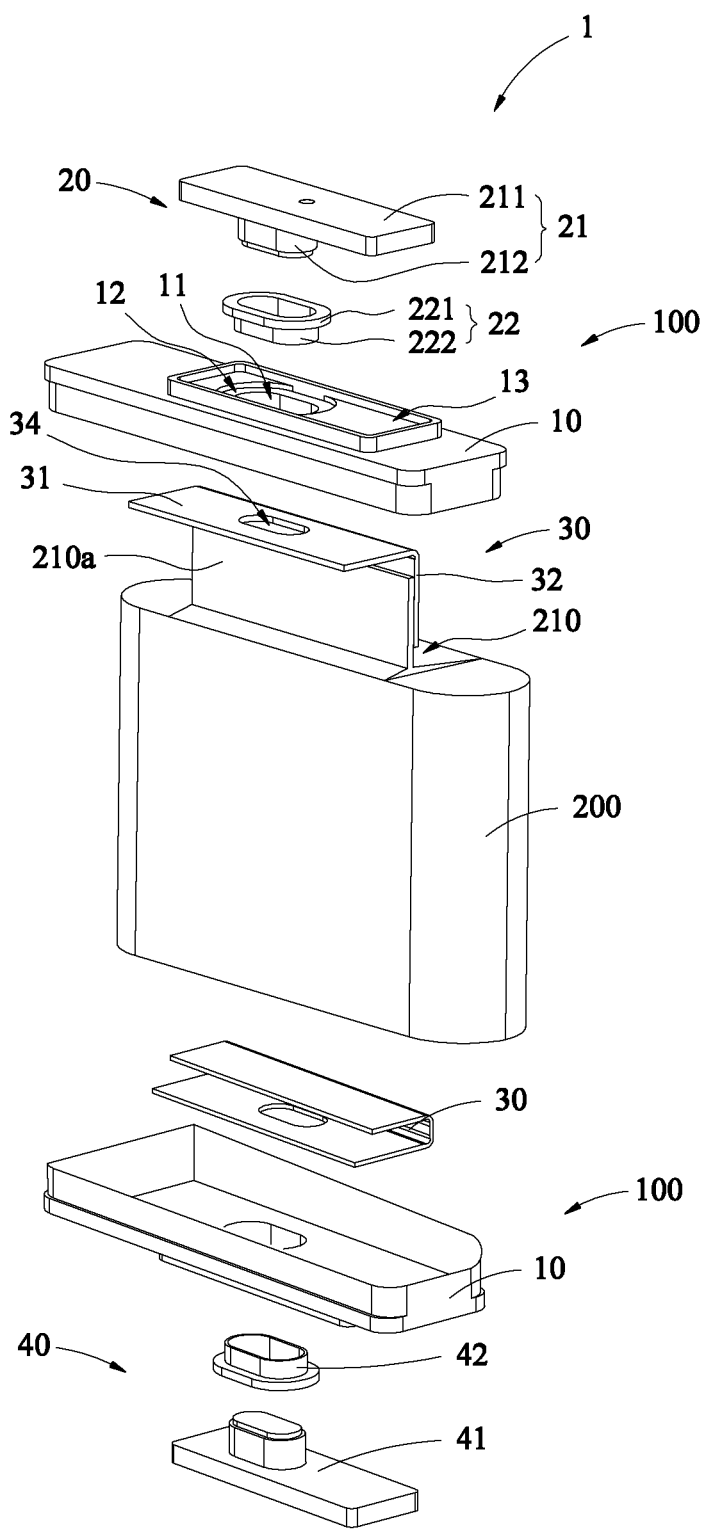
FIG. 5 is a schematic view of another attachment state of the secondary battery in FIGS. 1 and 2.

FIG. 4 is a schematic view of one attachment state of the secondary battery 1 in FIGS. 1 and 2; FIG. 5 is a schematic view of another attachment state of the secondary battery 1 in FIGS. 1 and 2. In the actual connection process, when the connection between the electrode terminal 21 and the tab 210 of the electrode assembly 200 is achieved by the current collecting wiring board 30, the current collecting wiring board 30 is firstly provided in a substantially inverted L shape as a whole, and the first connection portion 31 of the current collecting wiring board 30 is then welded to the electrode terminal 21, so as to facilitate operation. As shown in FIGS. 3 to 5, according to a specific example of the present disclosure, in order to make the connection of the current collecting wiring board 30 and the electrode terminal 21 more stable, an attachment hole 34 is provided on the first connection portion 31, and correspondingly, a boss 212a is provided on a surface, of the extension portion 212 of the electrode terminal 21, facing the electrode assembly 200; an area of a cross section of the boss 212a is smaller than the area of the cross section of the extension portion 212, and a shape of the boss 212a matches a shape of the attachment hole 34. Specifically, the attachment hole 34 is provided at a substantially center position of the first connection portion 31, the boss 212a extends from a lower surface of the extension portion 212 (i.e., a surface facing the electrode assembly 200) toward a direction close to the electrode assembly 200 and extends into the attachment hole 34, and the lower surface of the extension portion 212 abuts against an upper surface of the first connection portion 31 (i.e., a surface facing away from the electrode assembly 200), thereby the extension portion 212 and the first connection portion 31 may be welded.

Since the area of the cross section of the boss 212a is smaller than the area of the cross section of the extension portion 212, and a size of the attachment hole 34 matches a size of the boss 212a, the extension portion 212 will form an abutment fit with the first connection portion 31 when the electrode terminal 21 and the first connection portion 31 are connected, therefore the electrode terminal 21 can play a role of attaching and positioning by the boss 212a in the actual assembling process. In addition, the engagement between the attachment hole 34 and the boss 212a facilitates realizing the welding operation of the electrode terminal 21 and the first connection portion 31, thereby the connection strength between the electrode terminal 21 and the current collecting wiring board 30 can be improved.

According to an exemplary embodiment of the present disclosure, since the top cover plate 10 is made of an insulating material, the first connection portion 31 of the current collecting wiring board 30 can be directly fitted against the top cover plate 10, without providing an insulating member between the first connection portion 31 and the top cover plate 10, thereby the space occupied by the top cover assembly 100 can be reduced, and the energy density of the secondary battery 1 can be promoted.

According to an optional embodiment of the present disclosure, the respective cross-section of the attachment hole 34 and the boss 212a may also be correspondingly provided as an oval or a square in shape, thereby the objective of preventing the relative rotation between the electrode terminal 21 and the current collecting wiring board 30 can be achieved, and the connection reliability between the electrode terminal 21 and the current collecting wiring board 30 can be improved.

Thus, by welding the extension portion 212 of the electrode terminal 21 to the first connection portion 31 of the current collecting wiring board 30 after passing the extension portion 212 of the electrode terminal 21 through the top cover plate 10, the electrode terminal 21 can be fixed to the top cover plate 10, without providing separately other fixing structures on the electrode terminal 21 itself. Therefore, the structure of the top cover assembly 100 can be simplified. Compared with the existing electrode column structure provided on the top cover plate 10 of the secondary battery 1, the electrode terminal 21 in the embodiment of the present disclosure can improve the production efficiency of the secondary battery 1 and reduce the production cost. Moreover, the space inside the secondary battery 1 is not necessarily occupied, and thus the energy density of the secondary battery 1 can be effectively improved. Since the connection method for the tab 210 of the electrode assembly 200 and the current collecting wiring board 30 is simple, the assembling efficiency of the secondary battery 1 can be effectively promoted.

In addition, according to an optional embodiment of the present disclosure, in order to prevent the electrode terminal 21 from rotating relative to the top cover plate 10 after the electrode terminal 21 is attached to the top cover plate 10, the cross section of the extension portion 212 of the electrode terminal 21 and the cross section of the electrode lead-out hole 11 are adaptively provided as ovals in shapes. Thus, after the electrode terminal 21 is attached to the top cover plate 10 through the electrode lead-out hole 11, the extension portion 212 extends into the electrode lead-out hole 11, and under the engagement of the extension 212 and the electrode lead-out hole 11 with each other, the extension portion 212 does not rotate circumferentially in the electrode lead-out hole 11, thereby the electrode terminal 21 can be limited. The prevention of the rotation of the electrode terminal 21 relative to the top cover plate 10 may affect the connection stability between the electrode terminal 21 and the electrode assembly 200 inside the case. Apparently, the cross-sections of the extension portion 212 and the electrode lead-out hole 11 may also be correspondingly provided as other shapes, for example squares, so the electrode terminal 21 can be also limited, and the objective of preventing the electrode terminal 21 from rotating relative to the top cover plate 10 can be achieved.

According to an optional embodiment of the present disclosure, a first groove 13 is further provided on a side of the top cover plate 10 away from the electrode assembly 200, and the first groove 13 surrounds a periphery of the electrode lead-out hole 11 and has a predetermined depth. A shape of the first groove 13 is adapted to a shape of the base portion 211 of the electrode terminal 21, since the base portion 211 has a square plate body, the first groove 13 is correspondingly provided as a square groove. At least part of the base portion 211 is received in the first groove 13, that is, the base portion 211 may be partially received in the first groove 13, such that the partial structure of the base portion 211 is exposed to outside, so as to achieve a welding connection of the electrode terminal 21 with the bus-bar by the base portion 211.

According to a specific example of the present disclosure, the first groove 13 is formed by an annular flange surrounding the outer periphery of the electrode lead-out hole 11, and the flange is integrally provided on the top cover plate 10. However, in other variable embodiments, the first groove 13 may also be formed by providing a recess on the top cover plate 10.

In addition, in an optional embodiment, a receiving groove may also be formed on a lower side of the top cover plate 10, so as to receive the first connection portion 31 in the receiving groove along a thickness direction. By forming a receiving groove on the lower surface of the top cover plate 10, the height space occupied by the top cover assembly 100 can be further reduced, thereby the energy density of the secondary battery 1 can be further promoted. A depth of the receiving groove may be smaller than a thickness of the first connection portion 31, such that a part of the first connection portion 31 is received in the lower receiving groove. Apparently, in some embodiments, the depth of the receiving groove is larger than the thickness of the first connection portion 31, such that the first connection portion 31 can be wholly received in the receiving groove, thereby the occupied space can be saved to the greatest extent.

In addition, in order to ensure the tightness of the electrode lead-out hole 11, a sealing member 22 is provided between the electrode terminal 21 and the top cover plate 10. The sealing member 22 as a whole has a rotating-body structure, and includes a body portion 221 which is annular and an annular flange 222 extending outwardly from a circumferential edge of an inner hole of the body portion 221; the body portion 221 is sandwiched between the top cover plate 10 and the base portion 211 of the electrode terminal 21, and is in contact with the base portion 211 and the top cover plate 10 respectively; and the annular flange 222 extends into the electrode lead-out hole 11 and is sandwiched between the top cover plate 10 and the extension portion 212 of the electrode terminal 21. Thus, the sealing member 22 is in close contact with the top cover plate 10 and the electrode terminal 21 respectively to seal the electrode lead-out hole 11, thereby the air-tightness of the secondary battery 1 can be ensured.

In addition, in an optional embodiment, a second groove 12 is further provided on the top cover plate 10 surrounding the electrode lead-out hole 11. An expansion area of the second groove 12 is smaller than an expansion area of the first groove 13, and a depth of the second groove 12 is larger than the depth of the first groove 13, so the second groove 12 forms a stepped structure around the electrode lead-out hole 11. At least part of the body portion 221 of the sealing member 22 can be received in the second groove 12, so as to limit the sealing member 22 by the second groove 12, thereby the sealing member 22 can be prevented from moving between the electrode terminal 21 and the top cover plate 10; meantime, the overall thickness of the top cover assembly 100 can be reduced, thereby the energy density of the secondary battery 1 can be improved. In addition, since the base portion 211 of the electrode terminal 21 is fixed to an upper portion of the top cover plate 10 (relative to the case of the secondary battery 1), the base portion 211 can provide a pressing force for the sealing member 22 at all times, thereby the sealing performance of the sealing member 22 can be further improved. Moreover, the sealing member 22 is provided to be isolated from the inside of the case by the extension portion 212 and the first connection portion 31, so the sealing member 22 can be prevented from contacting the electrolyte inside the case, so as to prevent the sealing member 22 from swelling.

Apparently, the specific shape of the sealing member 22 is not limited to the embodiment of the present disclosure. In other embodiments, the rotating-body structure of the sealing member 22 may also be replaced by a rectangle or other shapes, and apparently, at this time, the second groove 12 on the top cover plate 10 needs to be provided adaptive to the shape of the sealing member 22.

As shown in FIGS. 4 and 5, after the connection between the first connection portion 31 and the electrode terminal 21 is completed (apparently, in order to clarify the structure, FIG. 5 does not show the connection state of the electrode terminal 21 and the first connection portion 31), the tab 210 needs to be connected to the second connection portion 32 of the current collecting wiring board 30. Each tab 210 of the electrode assembly 200 generally includes a plurality of laminated sheets; in order to connect with the second connection portion 32 of the current collecting wiring board 30, the tab 210 is bent relative to the thickness direction of the top cover plate 10 to form a bent portion 210a, and the bent portion 210a correspond to the plurality of laminated sheets extending along the width direction of the top cover plate 10.

Specifically, in the attaching process, the current collecting wiring board 30 is connected to the tab 210 in an inverted L shape, and up to this time, the tab 210 has not been bent relative to the main body of the electrode assembly 200. That is, the second connection portion 32 and the transition portion 33 are perpendicular to the first connection portion 31, while the tab 210 extends in a direction toward the top cover plate 10. At this time, the tab 210 is firstly fitted against the second connection portion 32 from a side close to the first connection portion 31, and the second connection portion 32 and the tab 210 which are fitted against each other are welded by ultrasonic welding; the current collecting wiring board 30 and the tab 210 may then be bent, and the first connection portion 31 and the second connection portion 32, after being bent, are parallel to and separated from each other, such that the current collecting wiring board 30 is configured as a substantially C shape, and the bent portion 210a formed by bending the tab 210 is disposed between the first connection portion 31 and the second connection portion 32, and in some embodiments, the tab 210 is bent around an edge of the second connection portion 32.

Thus, by providing the bent portion 210a between the first connection portion 31 and the second connection portion 32, on the one hand, a short circuit can be prevented that is caused by the contact between the positive electrode plate and the negative electrode plate of the main body of the electrode assembly 200 resulting from the droopiness of an end portion of the tab 210 in the direction toward the electrode assembly 200 under the action of gravity, thereby the safety and reliability of the secondary battery 1 can be promoted. On the other hand, since the transition portion 33 is provided between the first connection portion 31 and the second connection portion 32, there is a gap between the first connection portion 31 and the second connection portion 32; by providing the bent portion 210a between the first connection portion 31 and the second connection portion 32, the space between the first connection portion 31 and the second connection portion 32 can be further utilized, and the connection structure between the electrode terminal 21 and the tab 210 can be prevented from occupying too much space inside the secondary battery 1, thereby the energy density of the secondary battery 1 can be promoted.

In addition, by providing the transition portion 33 between the first connection portion 31 and the second connection portion 32, the electrode terminal 21 and the first connection portion 31 may be connected by laser welding, and the second connection portion 32 and the bent portion 210a may be connected by ultrasonic welding, thereby the connection between the electrode terminal 21 and the tab 210 can be simplified. Meantime, a separate connection plate body does not need to be provided for the electrode terminal 21 inside the secondary battery 1, therefore too much internal space cannot be occupied, thereby the energy density of the secondary battery 1 can be promoted. Moreover, when the secondary battery 1 vibrates up and down in use process, the transition portion 33 can absorb the vibration, thereby the tab 210 can be prevented from being torn due to the inability to deform when the secondary battery 1 vibrates.

As above, in the secondary battery 1 in the embodiment of the present disclosure, the current collecting wiring board 30 disposed inside the case 300 is configured to include the first connection portion 31, the second connection portion 32, and the transition portion 33 connected between the first connection portion 31 and the second connection portion 32, and the first connection portion 31 and the second connection portion 32 extend along the width direction of the top cover plate 10 and are provided opposite to each other. Moreover, the tab 210 of the electrode assembly 100 disposed inside the case 300 is bent to form the bent portion 210a, and the current collecting wiring board 30 is connected with the electrode terminal 21 disposed on the side of the top cover plate 10 away from the electrode assembly 200 by the first connection portion 31, and is connected with the bent portion 210a by the second connection portion 32, thereby electrical connection between the electrode terminal 21 and the electrode assembly 200 is achieved. Therefore, the energy density of the secondary battery 1 in the embodiment of the present disclosure can be promoted, by improving the space utilization rate inside the case 300. Meantime, the connection stability between the electrode terminal 21 and the electrode assembly 200 can be ensured, thereby the use reliability of the secondary battery 1 can be promoted.

According to an optional embodiment of the present disclosure, a first notch 35 is provided on an inner surface at a junction of the first connection portion 31 and the transition portion 33, while a second notch 36 is provided on an inner surface at a junction of the second connection portion 32 and the transition portion 33. Thus, the current collecting wiring board 30 may be bent into a substantially C-shaped structure more smoothly by the first notch 35 and the second notch 36. Meantime, since the first notch 35 and the second notch 36 are disposed on the inner surface of the bent current collecting wiring board 30, the bottom of the first notch 35 and the second notch 36 will be subjected to compressive stress when the current collecting wiring board 30 is bent; therefore, by the provision of the first notch 35 and the second notch 36, the breakage of the current collecting wiring board 30 due to tensile stress subjected to by the bottom of notches can be prevented on the premise of ensuring that the current collecting wiring board 30 is bent smoothly.

Apparently, the structure of the second terminal assembly 40 is similar to that of the first terminal assembly 20, the second terminal assembly 40 includes the electrode terminal 41 and the sealing member 42; and the electrode terminal 41 has the same structure and attachment method as the electrode terminal 21, while the sealing member 42 has the same structure and attachment method as the sealing member 22, except that the second terminal assembly 40 is attached to the opposite side of the first terminal assembly 20 by the top cover assembly 100 disposed on the other side of the secondary battery 1.

Figure 6:
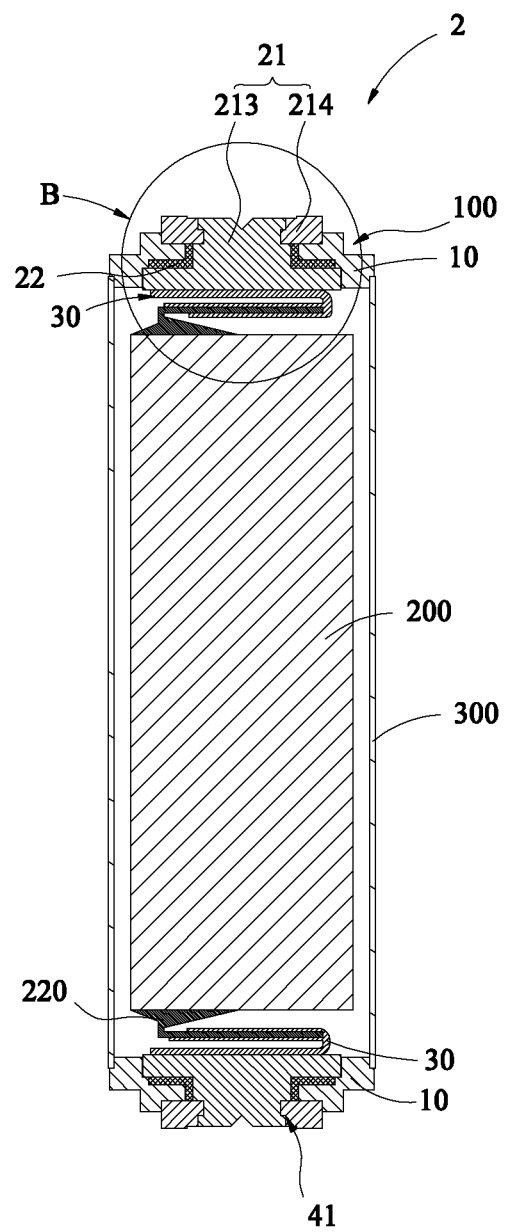
FIG. 6 is a schematic view of a sectional structure taken along a width direction of a secondary battery according to another embodiment of the present disclosure.
Figure 7:
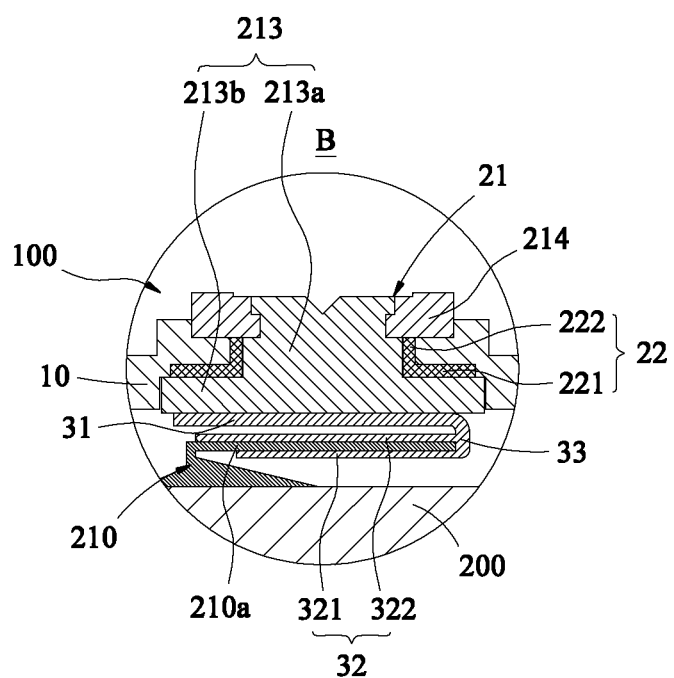
FIG. 7 is an enlarged schematic view of a partial structure of part B of the secondary battery in FIG. 6.
Figure 8:
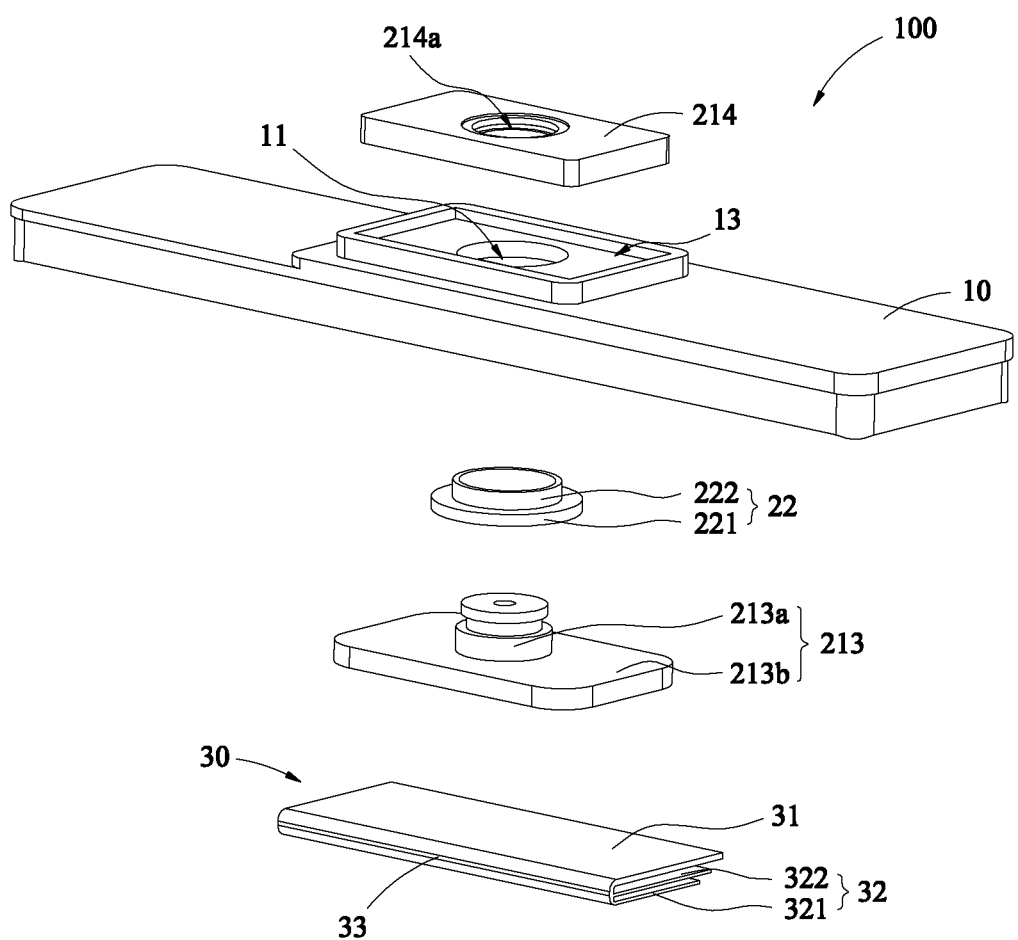
FIG. 8 is an exploded schematic view of a top cover assembly in the secondary battery in FIG. 6.

FIG. 6 is a schematic view of a sectional structure taken along a width direction of a secondary battery 2 according to another embodiment of the present disclosure; FIG. 7 is an enlarged schematic view of a partial structure of part B of the secondary battery 2 in FIG. 6; FIG. 8 is an exploded schematic view of a top cover assembly 100 in the secondary battery 2 in FIG. 6. As shown in FIGS. 6 to 8, according to another embodiment of the present disclosure, the secondary battery 2 is also provided, for ease of understanding, the same members of the secondary battery 2 in this embodiment as the secondary battery 1 in the above embodiment adopt the same reference numerals, and the members that have already been described will not be described again. In addition, in this embodiment, the case 300 of the secondary battery 2 is illustrated.

In this embodiment, the secondary battery 2 differs from the secondary battery 1 in the above-described embodiment in that the electrode terminal 21 of the secondary battery 2 in this embodiment includes an electrode column 213 and a connection plate 214; the connection plate 214 as the external wiring portion of the electrode terminal 21 is connected with the external bus-bar, and the electrode column 213 as the internal wiring portion of the electrode terminal 21 is connected with the electrode assembly 200 inside the case. Specifically, the connection plate 214 is disposed on a side of the top cover plate 10 facing away from the electrode assembly 200, and the connection plate 214 includes a through hole 214a and is received in the first groove 13, such that the through hole 214a is aligned with the electrode lead-out hole 11.

The electrode column 213 includes a bottom portion 213b and an elongation portion 213a; an area of a cross section of the bottom portion 213b is larger than an area of a cross section of the elongation portion 213a. In the specific attaching process, the bottom portion 213b is disposed on a side of the top cover plate 10 facing the electrode assembly 200 and abuts against the top cover plate 10, and the elongation portion 213a extends into the electrode lead-out hole 11, and the elongation portion 213a is exposed to outside through the electrode lead-out hole 11 and the through hole 214a and are riveted to the connection plate 214.

In this embodiment, by way of example, the sealing member 22 is disposed between the electrode terminal 21 and the top cover plate 10, and the body portion 221 of the sealing member 22 is sandwiched between the bottom portion 213b and the top cover plate 10, while the annular flange 222 is sandwiched between the elongation portion 213a and the top cover plate 10, so as to seal the electrode lead-out hole 11 by the sealing member 22.

In addition, in this embodiment, the second connection portion 32 of the current collecting wiring board 30 includes a first plate body 321 and a second plate body 322, the first plate body 321 and the second plate body 322 are both connected to the transition portion 33; moreover, the first plate body 321 and the second plate body 322 are parallel to each other and are kept at a certain interval. Thus, when the bent portion 210a is provided between the first connection portion 31 and the second connection portion 32, the bent portion 210a may be disposed between the first plate body 321 and the second plate body 322 and be in contact with the first plate body 321 and the second plate body 322, such that the bent portion 210a can be further protected by the first plate body 321 and the second plate body 322. Apparently, the first plate body 321 and the second plate body 322 may not be in contact with the bent portion 210a.

Since the rest of the structure in this embodiment is same as that of the secondary battery 1 in the above-mentioned embodiment, it has the same advantages as the secondary battery 1, and will not be repeated here.

The present disclosure can be implemented in other specific forms without departing from its gist and essential characteristics. Therefore, the current embodiments are considered to be illustrative rather than limitative in all respects, the scope of the present disclosure is defined by the appended claims rather than the above description; and all the modifications falling within the meaning of the claims and the equivalents thereof are thus involved in the scope of the present disclosure. Moreover, different technical features appearing in different embodiments can be combined, so as to achieve beneficial effects. Those skilled in the art should be able to understand and implement other variable embodiments of the disclosed embodiments on the basis of studying the drawings, the description and the claims.

What is claimed is:

1. A secondary battery comprising:
   a case comprising an opening;
   a top cover assembly comprising a top cover plate and an electrode terminal, the top cover plate covering the opening and comprising an electrode lead-out hole corresponding to the electrode terminal;
   an electrode assembly received in the case, the electrode assembly comprising a main body and a tab, the tab extending out from a side of the main body close to the top cover plate and being bent relative to a thickness direction of the top cover plate to form a bent portion; and
   a current collecting wiring board disposed between the top cover plate and the main body, the current collecting wiring board comprising a first connection portion, a second connection portion, and a transition portion connected between the first connection portion and the second connection portion, the first connection portion being connected with the electrode terminal,
   the second connection portion comprising a first plate body and a second plate body each of which is connected to the transition portion, the first plate body being substantially parallel to the second plate body, and
   after the bent portion of the tab is placed between the first plate body and second plate body, the bent portion of the tab and the second connection portion are bent together to allow the second connection portion becoming substantially parallel to the first connection portion,
   wherein the electrode terminal comprises a connection plate and an electrode column, the connection plate is disposed on a side of the top cover plate facing away from the electrode assembly, the electrode column is connected between the connection plate and the current collecting wiring board, the electrode column comprises a bottom portion, the bottom portion is sandwiched between the top cover plate and the first connection portion of the current collecting wiring board, and abuts against the top cover plate and the first connection portion of the current collecting wiring board, respectively.

2. The secondary battery according to claim 1, wherein the electrode column comprises an elongation portion connected to the bottom portion, an area of a cross section of the bottom portion is larger than an area of a cross section of the elongation portion, and the elongation portion penetrates through the electrode lead-out hole and is connected with the connection plate.

3. The secondary battery according to claim 2, wherein a cross section of the elongation portion is one of oval and square in shape, and a shape of the cross section of the electrode lead-out hole matches a shape of the cross section of the elongation portion.

4. The secondary battery according to claim 2, wherein the top cover plate further comprises a first groove, the first groove surrounds a periphery of the electrode lead-out hole and is disposed on a side of the top cover plate facing the electrode assembly, and at least part of the bottom portion of the electrode column is received in the first groove.

5. The secondary battery according to claim 4, wherein the secondary battery further comprises a sealing member, the sealing member comprises a body portion which is annular and an annular flange extending outwardly from an circumferential edge of an inner hole of the body portion, the body portion is disposed between the bottom portion of the electrode column and the top cover plate, the annular flange extends into the electrode lead-out hole, and are in contact with the elongation portion of the electrode column and the top cover plate, respectively.

6. The secondary battery according to claim 5, wherein the top cover plate further comprises a second groove which is annular, the second groove surrounds a periphery of the electrode lead-out hole and is disposed on a side of the top cover plate facing the electrode assembly, and the body portion of the sealing member is at least partially received in the second groove.

7. The secondary battery according to claim 1, wherein the tab is bent around an edge of the second connection portion to form the bent portion, and the bent portion is disposed between the first connection portion and the second connection portion.

8. The secondary battery according to claim 1, wherein the first connection portion, the transition portion, and the second connection portion have an integral structure.

9. The secondary battery according to claim 8, wherein a first notch is provided on an inner surface at a junction of the first connection portion and the transition portion.

10. The secondary battery according to claim 6, wherein the top cover plate further comprises a third groove which is annular, the third groove surrounds a periphery of the electrode lead-out hole and is disposed on a side of the top cover plate facing away from the electrode assembly, and at least part of the connection plate is at least partially received in the third groove.

11. The secondary battery according to claim 9, wherein a second notch is provided on an inner surface at a junction between the second connection portion and the transition portion.

12. The secondary battery according to claim 2, wherein the tab is bent around an edge of the second connection portion to form the bent portion, and the bent portion is disposed between the first connection portion and the second connection portion.

13. The secondary battery according to claim 2, wherein the first connection portion, the transition portion, and the second connection portion have an integral structure.

14. A secondary battery comprising:
a case comprising an opening;
a top cover assembly comprising a top cover plate and an electrode terminal, the top cover plate covering the opening and comprising an electrode lead-out hole corresponding to the electrode terminal;
an electrode assembly received in the case, the electrode assembly comprising a main body and a tab, the tab extending out from a side of the main body close to the top cover plate; and
a current collecting wiring board disposed between the top cover plate and the main body, the current collecting wiring board comprising a first connection portion, a second connection portion, and a transition portion connecting the first connection portion and the second connection portion, wherein
the first connection portion is connected with the electrode terminal,
the second connection portion comprises a first plate body and a second plate body each of which is connected to the transition portion, the first plate body being substantially parallel to the second plate body, and
after a portion of the tab is placed between the first plate body and the second plate body, the portion of the tab and the second connection portion are bent together to allow the second connection portion becoming substantially parallel to the first connection portion.

15. The secondary battery according to claim 14, wherein the first plate body is longer than the second plate body, thereby allowing the first plate body to protect the tab when the tab and the second connection portion are bent together.

* * * * *